US011475488B2

(12) United States Patent
Copeland et al.

(10) Patent No.: US 11,475,488 B2
(45) Date of Patent: Oct. 18, 2022

(54) DYNAMIC SCRIPTS FOR TELE-AGENTS

(71) Applicant: Accenture Global Solutions Limited, Dublin (IE)

(72) Inventors: Shannon L. Copeland, Atlanta, GA (US); Burton M. Smith, III, Atlanta, GA (US)

(73) Assignee: Accenture Global Solutions Limited, Dublin (IE)

( * ) Notice: Subject to any disclaimer, the term of this patent is extended or adjusted under 35 U.S.C. 154(b) by 492 days.

(21) Appl. No.: 15/700,210

(22) Filed: Sep. 11, 2017

(65) Prior Publication Data
US 2019/0080370 A1  Mar. 14, 2019

(51) Int. Cl.
| | | |
|---|---|---|
| *G06F 16/20* | (2019.01) | |
| *G06Q 30/02* | (2012.01) | |
| *H04M 3/487* | (2006.01) | |
| *H04M 3/493* | (2006.01) | |
| *G06Q 40/04* | (2012.01) | |
| *H04M 3/51* | (2006.01) | |
| *G06F 16/00* | (2019.01) | |
| *G06F 16/24* | (2019.01) | |
| *G06Q 30/00* | (2012.01) | |
| *H04M 3/40* | (2006.01) | |

(Continued)

(52) U.S. Cl.
CPC ......... *G06Q 30/0281* (2013.01); *G06F 16/00* (2019.01); *G06F 16/24* (2019.01); *G06Q 40/04* (2013.01); *H04M 3/4878* (2013.01); *H04M 3/4936* (2013.01); *H04M 3/4938* (2013.01); *H04M 3/5133* (2013.01); *H04M 3/5175* (2013.01); *H04M 2203/402* (2013.01)

(58) Field of Classification Search
CPC ..... G06Q 30/0281; G06Q 40/04; G06F 16/24
USPC ...................................................... 707/758
See application file for complete search history.

(56) References Cited

U.S. PATENT DOCUMENTS

| | | | |
|---|---|---|---|
| 6,785,380 | B2 | 8/2004 | Ribera |
| 6,829,603 | B1 | 12/2004 | Chai et al. |
| 7,275,083 | B1 | 9/2007 | Seibel et al. |

(Continued)

FOREIGN PATENT DOCUMENTS

| | | |
|---|---|---|
| KR | 1020180058877 | 7/2018 |
| WO | 2016139666 A1 | 9/2016 |

OTHER PUBLICATIONS

Jul. 25, 2019 Office Action for related U.S. Appl. No. 16/198,742.

(Continued)

*Primary Examiner* — Kristopher Andersen
(74) *Attorney, Agent, or Firm* — Fish & Richardson P.C.

(57) ABSTRACT

Embodiments of the present invention include a dynamic script engine for tele-agents including a statistics engine configured to receive, during a sales call, real-time industry trend data from one or more remote industry resources; create a current industry score in dependence upon the industry trend data and current products available to a customer on an active call; and transmit the current industry score to a script generator; and a script generator configured to receive the current industry score from the statistics engine and dynamically reorder in real-time and in dependence upon the industry score one or more sentences of a dynamic script to be read by a sales agent to the customer during the sales call.

15 Claims, 6 Drawing Sheets

(51) Int. Cl.
*G06Q 40/00* (2012.01)
*H04M 3/50* (2006.01)

(56) References Cited

U.S. PATENT DOCUMENTS

| | | | |
|---|---|---|---|
| 7,486,785 | B2 | 2/2009 | Flores |
| 8,108,237 | B2 | 1/2012 | Bourne et al. |
| 8,332,279 | B2* | 12/2012 | Woolston ............... G06Q 20/10 705/26.1 |
| 8,411,843 | B1 | 4/2013 | Cyriac |
| 9,049,295 | B1 | 6/2015 | Cooper |
| 9,165,556 | B1 | 10/2015 | Sugar |
| 9,848,082 | B1 | 12/2017 | Lilland |
| 9,860,391 | B1 | 1/2018 | Wu et al. |
| 9,948,783 | B1 | 4/2018 | Farrell |
| 10,026,092 | B2 | 7/2018 | Heater et al. |
| 10,101,976 | B2 | 10/2018 | Cavalcante |
| 10,303,466 | B1 | 5/2019 | Karman |
| 10,482,384 | B1 | 11/2019 | Stoilos |
| 2003/0126136 | A1 | 7/2003 | Omoigui |
| 2004/0143473 | A1 | 7/2004 | Tivey et al. |
| 2005/0044357 | A1 | 1/2005 | Datig |
| 2005/0105712 | A1 | 5/2005 | Williams et al. |
| 2006/0095273 | A1 | 5/2006 | Montvay et al. |
| 2006/0098625 | A1 | 5/2006 | King |
| 2006/0239439 | A1 | 10/2006 | Blackwood |
| 2007/0019618 | A1 | 1/2007 | Shaffer |
| 2007/0064913 | A1 | 3/2007 | Shaffer |
| 2007/0094183 | A1 | 4/2007 | Paek et al. |
| 2007/0233561 | A1 | 10/2007 | Golec |
| 2008/0162498 | A1 | 7/2008 | Omoigui |
| 2008/0275744 | A1 | 11/2008 | MacIntyre et al. |
| 2009/0070322 | A1 | 3/2009 | Salvetti |
| 2009/0245500 | A1 | 10/2009 | Wampler |
| 2009/0271192 | A1 | 10/2009 | Marquette |
| 2010/0036788 | A1 | 2/2010 | Wu |
| 2010/0063799 | A1 | 3/2010 | Jamieson |
| 2010/0114563 | A1 | 5/2010 | Choi |
| 2011/0077999 | A1 | 3/2011 | Becker et al. |
| 2011/0082829 | A1 | 4/2011 | Kolovski |
| 2011/0113094 | A1 | 5/2011 | Chunilal |
| 2011/0206198 | A1 | 8/2011 | Freedman |
| 2011/0264451 | A1 | 10/2011 | Hoepfinger |
| 2012/0023006 | A1 | 1/2012 | Roser et al. |
| 2012/0059776 | A1 | 3/2012 | Estes |
| 2012/0078636 | A1 | 3/2012 | Ferrucci |
| 2012/0233558 | A1 | 9/2012 | Naim |
| 2012/0275642 | A1 | 11/2012 | Aller |
| 2012/0278091 | A1* | 11/2012 | Yaseen ................... G06Q 30/02 705/1.1 |
| 2013/0091090 | A1 | 4/2013 | Spivack et al. |
| 2013/0006916 | A1 | 6/2013 | Mcbride |
| 2013/0163731 | A1 | 6/2013 | Yan |
| 2013/0204663 | A1 | 8/2013 | Kahlow |
| 2014/0022328 | A1 | 1/2014 | Gechter et al. |
| 2014/0081934 | A1 | 3/2014 | Mizell |
| 2014/0122535 | A1 | 5/2014 | Gerard |
| 2014/0164502 | A1 | 6/2014 | Khodorenko |
| 2014/0189680 | A1 | 7/2014 | Kripalani |
| 2014/0201234 | A1 | 7/2014 | Lee et al. |
| 2014/0270108 | A1 | 9/2014 | Riahi et al. |
| 2014/0278343 | A1 | 9/2014 | Tran |
| 2014/0314225 | A1 | 10/2014 | Riahi |
| 2014/0372630 | A1 | 12/2014 | Bostick |
| 2014/0379755 | A1 | 12/2014 | Kuriakose |
| 2015/0012350 | A1 | 1/2015 | Li et al. |
| 2015/0066479 | A1 | 3/2015 | Pasupalak |
| 2015/0189085 | A1 | 7/2015 | Riahi et al. |
| 2015/0201077 | A1* | 7/2015 | Konig ................... H04M 3/5175 379/265.07 |
| 2015/0242410 | A1 | 8/2015 | Pattabhiraman et al. |
| 2015/0261743 | A1 | 9/2015 | Sengupta |
| 2015/0294405 | A1 | 10/2015 | Hanson |
| 2015/0348551 | A1 | 12/2015 | Gruber |
| 2015/0379603 | A1 | 12/2015 | Gupta |
| 2016/0019882 | A1 | 1/2016 | Matula |
| 2016/0021181 | A1 | 1/2016 | Ianakiev et al. |
| 2016/0034457 | A1 | 2/2016 | Bradley |
| 2016/0036981 | A1 | 2/2016 | Hollenberg |
| 2016/0036982 | A1 | 2/2016 | Ristock |
| 2016/0036983 | A1 | 2/2016 | Korolev |
| 2016/0117593 | A1 | 4/2016 | London |
| 2016/0162474 | A1 | 6/2016 | Agarwal |
| 2016/0162913 | A1 | 6/2016 | Linden et al. |
| 2016/0171099 | A1 | 6/2016 | Lorge et al. |
| 2016/0188686 | A1 | 6/2016 | Hopkins |
| 2016/0189028 | A1 | 6/2016 | Hu et al. |
| 2016/0189558 | A1 | 6/2016 | McGann et al. |
| 2016/0217479 | A1 | 7/2016 | Kashyap et al. |
| 2016/0239851 | A1* | 8/2016 | Tanner, Jr. ............. G06F 16/288 |
| 2016/0321748 | A1* | 11/2016 | Mahatma ............... G06Q 40/08 |
| 2017/0017694 | A1 | 1/2017 | Roytman et al. |
| 2017/0200220 | A1 | 1/2017 | Hakkani-Tur |
| 2017/0091390 | A1 | 3/2017 | Joul |
| 2017/0124193 | A1 | 5/2017 | Li |
| 2017/0147635 | A1 | 5/2017 | Mcateer et al. |
| 2017/0154108 | A1 | 6/2017 | Li |
| 2017/0177715 | A1 | 6/2017 | Chang |
| 2017/0195488 | A1 | 8/2017 | Pendyaia |
| 2017/0262429 | A1 | 9/2017 | Harper |
| 2017/0262530 | A1 | 9/2017 | Okura |
| 2017/0293610 | A1 | 10/2017 | Tran |
| 2018/0082183 | A1 | 3/2018 | Hertz et al. |
| 2018/0115644 | A1 | 4/2018 | Al-Khaja |
| 2018/0144250 | A1 | 5/2018 | Kwon |
| 2018/0150459 | A1 | 5/2018 | Farid |
| 2018/0288098 | A1 | 10/2018 | Wang |
| 2018/0300310 | A1 | 10/2018 | Shinn |
| 2018/0315000 | A1 | 11/2018 | Kulkarni |
| 2018/0315001 | A1 | 11/2018 | Garner |
| 2018/0338040 | A1 | 11/2018 | Carly |
| 2018/0365772 | A1 | 12/2018 | Thompson |
| 2018/0376002 | A1 | 12/2018 | Abraham |
| 2019/0042988 | A1 | 2/2019 | Brown |
| 2019/0188617 | A1 | 6/2019 | Copeland |
| 2019/0206400 | A1 | 7/2019 | Cui |
| 2019/0220794 | A1 | 7/2019 | Kulkarni |
| 2019/0340294 | A1 | 11/2019 | Spangler |
| 2020/0042642 | A1 | 2/2020 | Bakis |
| 2020/0097814 | A1 | 3/2020 | Devesa |
| 2020/0110835 | A1 | 4/2020 | Zhao |

OTHER PUBLICATIONS

International Search Report dated Nov. 28, 2018 for corresponding PCT/US2018/049813.
International Search Report dated Feb. 22, 2019 for PCT/US2018/065584.
International Search Report and Written Opinion dated Dec. 30, 2019 for related PCT/US2019/062629.
International Search Report and Written Opinion dated Jan. 9, 2020 for related PCT/US2019/055488.
International Search Report and Written Opinion dated Jan. 14, 2020 for related PCT/US2019/060174.
International Search Report and Written Opinion dated Jan. 17, 2020 for related PCT/US2019/058997.
International Search Report and Written Opinion dated Mar. 9, 2020 for related PCT/US2019/059949.
International Search Report and Written Opinion dated Apr. 1, 2020 for related PCT/US2019/055483.
Liew. "Strategic integration of knowledge management and customer relationship 1-20 management." In: Journal of Knowledge Management. Jul. 18, 2008 (Jul. 18, 2008) Retrieved on Dec. 25, 2019 (Dec. 25, 2019) from <http://student.bms.lk/GDM/49/Slides/MarManaSampleAssi/MMAsuportingJouArti/13673270810884309.pdf> entire document.
Tung. "Google's human-sounding AI to answer calls at contact centers." In: ZDNet. Jul. 25, 2018 (Jul. 25, 2018) Retrieved on Dec. 25, 2019 (Dec. 25, 2019) from <https://www.zdnet.com/article/googles-human-sounding-ai-to-answer-calls-at-contact-centers/> entire document.

(56) References Cited

OTHER PUBLICATIONS

Jan. 25, 2020 Office Action for related U.S. Appl. No. 15/844,512.
Mar. 5, 2020 Office Action for related U.S. Appl. No. 16/183,736.
Jul. 27, 2020 Final Office Action for U.S. Appl. No. 15/844,512.
Jul. 30, 2020 Final Office Action for U.S. Appl. No. 16/154,718.
May 4, 2020 Office Action for U.S. Appl. No. 16/154,718.
Sep. 29, 2020 Office Action for U.S. Appl. No. 16/157,075.
Sep. 30, 2020 Office Action for U.S. Appl. No. 16/911,717.
EP Extended Search Report in European Appln. No. 18855035.4, dated Mar. 31, 2021, 7 pages.

* cited by examiner

DYNAMIC SCRIPTS FOR TELE-AGENTS

BACKGROUND

Cloud-based products and web-services products, computing systems and other software products are increasingly being sold over the phone by tele-agents. Such sales are often for complex systems and for very sophisticated customers. As an aid to interacting with the customer over the phone the tele-agents often use one or more applications that often include a dashboard and a script to guide the tele-agent in the agent's interaction with the customer. Current scripts are static and do not address how current events can often affect a customer's interest in a product, a customers need or desire for support regarding products or customer interests or needs.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
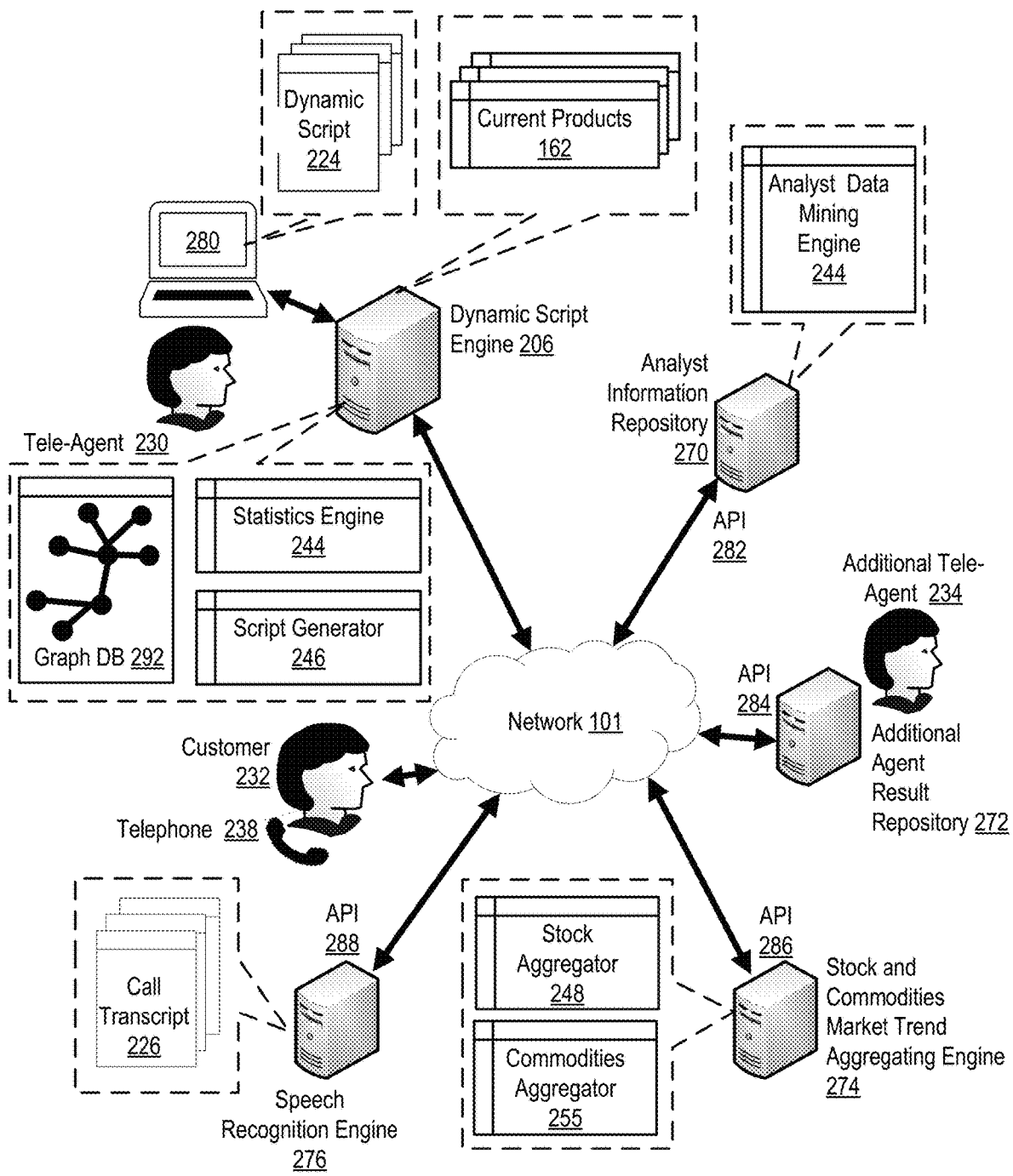
FIG. 1 sets forth a network diagram of a system for creating real-time dynamic scripts for tele-agents according to example embodiments of the present invention.

Example methods, systems, products and other features for creating contextually and industry-relevant real-time dynamic scripts for tele-agents are described with reference to the accompanying drawings beginning with FIG. 1. FIG. 1 sets forth a network diagram of a system for creating contextually-relevant, real-time dynamic scripts for tele-agents according to example embodiments of the present invention. Cloud-based applications, web-services applications, computing systems and other software products are increasingly being sold over the phone by tele-agents. These tele-agents are often able to modularize and customize product offerings to bring increased efficiency and efficacy to their customers' computing needs. For example, cloud-based or web-services products are highly customizable and various products may be combined to provide the best solution for the customer and can be further customized based upon region, industry, and many other factors as will occur to those of skill in the art. Such cloud-based web services often include computing applications, database applications, migration applications, network and content management applications, content delivery applications, business management tools, business analytics, artificial intelligence, mobile services and many more applications. Examples of providers of such software, cloud-computing platforms, and web-services include Amazon, Microsoft, Oracle, and many others. The examples of the services above and their providers are for explanation and not for limitation. As will occur to those of skill in the art many kinds of services from various providers may benefit from dynamic scripts according to embodiments of the present invention.

A tele-agent, as that term is used in this specification, is a person who handles incoming or outgoing customer calls for business, such as, for example, software, hardware or cloud-based web services sales. Such tele-agents are often subject matter experts regarding the products that they sell and support and often work in call centers handling sales, inquiries, customer complaints support issues and other related sales and support operations. The term tele-agent as it is used in this specification is meant to be inclusive and not limiting. Other example names for a tele-agent include call center agent, customer service representative (CSR), telephone sales or service representative (TSR), business development representative (BDR), attendant, associate, operator, account executive or team member.

Despite the fact that tele-agents often work in a call center which may have a physical address anywhere, these tele-agents typically interact with customers worldwide and across many industries. As such, it is useful to have real-time industry trend data influencing their interactions with their customers. Such real-time industry trend data may be directed to their customers industry and often the regional impact represented in that industry trend data as it affects the customer.

Time with any customer is valuable and every tele-agent should have the most current and relevant industry information available to best provide services to the customer. As such, the system of FIG. 1 provides a dynamic script engine (206) that creates in real-time a dynamic script for a tele-agent to use in communicating with the customer. A dynamic script is a script that changes in real-time in dependence upon various factors such as current industry trend data and often the specific products that the tele-agents supports and the products that the customer does or does not have. That is, the dynamic script is dynamic in the sense that it changes in real-time based on industry trends. The sentences in the script are dynamically reordered, added, or deleted in real-time for the benefit of the customer. Such sentences may be dynamically altered in the script by being dynamically reordered or created in real-time, retrieved from a repository of relevant industry and software descriptions, provided by other tele-agents, or in other ways as will occur to those of skill in the art.

As mentioned above, often the sentences are reordered in dependence upon products that the tele-agent supports. In some cases the sentences are reordered based upon products that the customer owns or has licensed. In other cases, the sentences are recorded based upon products that the customer does not own or has not licensed.

The system of FIG. 1 includes a dynamic script engine (206) for tele-agents (230). The dynamic script engine (206) of FIG. 1 is implemented as automated computing machinery that creates an on-call real-time dynamic script for a tele-agent. Automated computing machinery as that term is used in this specification means a module, segment, or portion of code or other automated computing logic, hardware, software, firmware, and others, as well as combination of any of the aforementioned, as will occur to those of skill in the art—both local and remote. Automated computing machinery is often implemented as executable instructions, physical units, or other computing logic for implementing the specified logical function(s) as will occur to those of skill in the art.

The dynamic script engine (206) of FIG. 1 includes a statistics engine (244) comprising automated computing machinery configured to receive, during a sales call, real-time industry trend data from one or more remote industry resources. In the example of FIG. 1, the remote industry resources include an analyst information repository (270), an additional agent result repository (272), stock commodities market trend aggregating engine (274) and a speech recognition engine (276), each of which is described in more detail below.

The statistics engine (244) of FIG. 1 is also configured to create a current industry score in dependence upon the industry trend data received from the remote industry resources (270, 272, 274, 276) and the current products available to a customer and supported by the tele-agent (230) on an active call and to transmit the current industry score to a script generator (246). The a script generator (246) is implemented as automated computing machinery configured to receive the current industry score from the statistics engine (244) and dynamically reorder in real-time and in dependence upon the industry score one or more sentences of a dynamic script to be read by a sales agent to the customer during the sales call or select additional sentences and description to insert into the dynamic script.

A current industry score created according to embodiments of the present invention and the example of FIG. 1 may be implemented may be implemented as a value, set of values, an N-dimensional vector, a formulaic representation or other value representation of a current state of an industry or its trends. The current industry score is used to select the sentences to be reordered, added, or deleted from the dynamic script, as well as to select the content of those sentences, and other dynamic script content creation and reformulation as will occur to those of skill in the art. The following are a non-exhaustive example representations of a current industry score:

"101" is an example numeric value that may be used to represent a rapid increase in the sales of a stock in a particular industry of a particular customer.

"1A2" is an example alpha numeric value that may be used to represent that example region 1 currently is experiencing the price of some example commodity "A" increasing.

"Oil.A.increasing.5.SA.webserv" is an example string value that may be used to represent that example oil prices in crude oil are increasing at a rate of 5 cents a barrel in the country of Saudi Arabia and a customer who is a current subscriber to a particular example web service.

The examples of current industry scores are provided for explanation and not for limitation. Current industry scores useful in embodiments of the present invention may come in many useful forms and all such useful forms are well within the scope of the present invention as will occur to those of skill in the art.

The statistics engine of FIG. 1 further comprises automated computing machinery to create a current industry score using logic which in turn creates in real-time a graph database including nodes, edges, and properties in dependence upon real-time trend data; traverse the graph database; to add or modify graph properties, and apply a machine learning engine to enhance graph properties for the traversed graph database; and create a current industry trend score in dependence of the application of the machine-learning engine to the traversed graph database.

A graph database is a database that uses graph structures for semantic queries with nodes, edges and properties to represent and store data. A key concept of this database system is the graph (or edge or relationship), which directly relates data items in the data store. The relationships allow data in the store to be linked together directly, and in many cases retrieved with one operation. Additionally, semantic graph databases use an underlying graph database to represent semantic (context and concepts) and other information in its most atomic form such as, for example, Subject, Predicate, Object and so on.

The graph database contrasts with conventional relational databases, where links between data are stored in the data, and queries search for this data within the store and use the join concept to collect the related data. Graph databases, by design, allow simple and fast retrieval of complex hierarchical structures that are difficult to model in relational systems. Additionally, semantic graph databases are adept at the on-the-fly integration of external data sources, often known as the Linked Open Data (LOD) standard. This feature enables instantaneous access to and synthesis of new information and insights from these newly accessed data sources, and which traditional SQL and No-SQL databases often struggle to perform.

The underlying storage mechanism of graph databases can vary. Some depend on a relational engine and store the graph data in a table. Others use a key-value store or document-oriented database for storage, making them inherently NoSQL structures.

Retrieving data from a graph database often requires a query language other than SQL, which was designed for relational databases and does not elegantly handle traversing a graph. There are a number of systems, most often tightly tied to one product and there are some multi-vendor query languages like Gremlin, SPARQL, and Cypher. In addition to having query language interfaces, some graph databases are accessed through application programming interfaces (APIs).

Graph databases are based on graph theory, and employ nodes, edges, and properties. Nodes represent entities such as people, businesses, accounts, or any other item to be tracked. They are roughly the equivalent of the record, relation, or row in a relational database, or the document in a document database. Edges, also termed graphs or relationships, are the lines that connect nodes to other nodes; they represent the relationship between them. Meaningful patterns emerge when examining the connections and interconnections of nodes, properties, and edges. Edges are the key concept in graph databases, representing an abstraction that is not directly implemented in other systems. Properties are germane information that relate to nodes. For example, if N3 were one of the nodes, it might be tied to properties such as web-services support, cloud-computing, or a word that starts with the letter N, depending on which aspects of N3 are germane to a given database.

The description of graph databases is for explanation and not for limitation. In fact, alternative embodiments may include SQL databases, relational databases, NoSQL, or any other viable database structure that will occur to those of skill in the art. Furthermore, embodiments of the present invention may include triplestore databases. A graph database typically has a more generalized structure than a triplestore, using graph structures with nodes, edges, and properties to represent and store data. Graph databases might provide index-free adjacency, meaning every element contains a direct pointer to its adjacent elements, and no index lookups are necessary. General graph databases that can store any graph are often considered distinct from specialized graph databases such as triplestores and network databases.

As mentioned above, the statistics engine of FIG. 1 may apply a machine learning engine to the traversed graph database and creates a current industry trend score in dependence of the application of the machine-learning engine to the traversed graph database. The machine learning engine of FIG. 1 is implemented as automated computing machinery configured for machine learning against a graph database. Machine learning is closely related to (and often overlaps with) computational statistics, which also focuses on prediction-making through the use of computers. Machine learning has strong ties to mathematical optimization, which delivers methods, theory and application domains to the field. Machine learning is sometimes conflated or equated with data mining, where the latter subfield focuses more on exploratory data analysis and is sometimes known as unsupervised learning. Often machine learning also includes supervised learning.

Within the field of data analytics, machine learning is a method used to devise complex models and algorithms that lend themselves to prediction; in commercial use, this is known as predictive analytics. These analytical models allow researchers, data scientists, engineers, and analysts to "produce reliable, repeatable decisions and results" and uncover "hidden insights" through learning from historical relationships and trends in the data.

The statistics engine of FIG. 1 further comprises automated computing machinery to create an industry score using logic implemented for regression analysis. Such logic may be implemented as a part of or distinct from a machine learning module. Regression analysis is a statistical process for estimating the relationships among variables. It includes many techniques for modeling and analyzing several variables, when the focus is on the relationship between a dependent variable and one or more independent variables (or 'predictors'). More specifically, regression analysis helps one understand how the typical value of the dependent variable (or 'criterion variable') changes when any one of the independent variables is varied, while the other independent variables are held fixed. Most commonly, regression analysis estimates the conditional expectation of the dependent variable given the independent variables—that is, the average value of the dependent variable when the independent variables are fixed. Less commonly, the focus is on a quantile, or other location parameter of the conditional distribution of the dependent variable given the independent variables. In most cases, the estimation target is a function of the independent variables called the regression function. In regression analysis, it is also often of interest to characterize the variation of the dependent variable around the regression function which can be described by a probability distribution. A related but distinct approach is necessary condition analysis (NCA), which estimates the maximum (rather than average) value of the dependent variable for a given value of the independent variable (ceiling line rather than central line) in order to identify what value of the independent variable is necessary but not sufficient for a given value of the dependent variable.

Regression analysis is widely used for prediction and forecasting, where its use has substantial overlap with and often inclusion in the field of machine learning. Regression analysis is also used to understand which among the independent variables are related to the dependent variable, and to explore the forms of these relationships. In restricted circumstances, regression analysis can be used to infer causal relationships between the independent and dependent variables. However this can lead to illusions or false relationships, so caution is advisable; for example, correlation does not imply causation.

Many techniques for carrying out regression analysis have been developed. Familiar methods such as linear regression and ordinary least squares regression are parametric, in that the regression function is defined in terms of a finite number of unknown parameters that are estimated from the data. Nonparametric regression refers to techniques that allow the regression function to lie in a specified set of functions, which may be infinite-dimensional.

The performance of regression analysis methods in practice depends on the form of the data generating process, and how it relates to the regression approach being used. Since the true form of the data-generating process is generally not known, regression analysis often depends to some extent on making assumptions about this process. These assumptions are sometimes testable if a sufficient quantity of data is available. Regression models for prediction are often useful even when the assumptions are moderately violated, although they may not perform optimally. However, in many applications, especially with small effects or questions of causality based on observational data, regression methods can give misleading results.

In a narrower sense, regression may refer specifically to the estimation of continuous response variables, as opposed to the discrete response variables used in classification. The case of a continuous output variable may be more specifically referred to as metric regression to distinguish it from related problems.

By way of example, an industry score may be calculated using regression analysis by analyzing known and unknown attributes of products available to the tele-agent and attributes of the customer. For example, the following attributes may be used to identify an industry score that useful in reordering, adding or deleting certain sentences or whole topics in a dynamic script according to embodiments of the present invention.

Industry Score=Product Available+Customer Location (e.g. Geography)+Industry+Company Size In the example above, regression analysis of the known variables may be used to compute an industry score based upon known and unknown variables. As the industry score gets higher for the known variables those variables may be used to then compute an industry score useful in dynamic script creation relevant to a particular customer. In other cases, unknown variables may be iteratively changed to influence the resultant industry score. Such an iterative method may be used to influence the sentences reordered, added or deleted in a dynamic script according to embodiments of the present invention.

The example equation above is for explanation and not for limitation. Equations useful in embodiments of the present invention may include many other or additional variables such as historical buying patterns, future purchase data, fiscal budget data, and many others as will occur to those of skill in the art.

As mentioned above, the dynamic script engine (206) of FIG. 1 is coupled for data communications through a network (101) to a number of example remote resources to retrieve industry trend data. The remote resources of FIG. 1 include an analyst information repository (270), an additional agent result repository (272), a stock and commodities market trend aggregating engine (274), a speech recognition engine (276), and a real-time telephone call with a customer (232).

The analyst information repository (270) of FIG. 1 is implemented as a repository or data store for storing, classifying, and analyzing analyst information. Such analyst information is typically the work product of one or more industry analysts and their respective staff. Typically, an industry analyst performs primary and secondary market research within an industry such as information technology, consulting or insurance, or other rapidly moving areas of industry. Analysts assess sector trends, create segment taxonomies, size markets, prepare forecasts, and develop industry models. Industry analysts often work for research and advisory services firms, and some analysts also perform advisory or consulting services. Analysts often specialize in a single industry segment or sub-segment, researching the broad development of the market, as well as publicly traded companies, equities, investments, commodities, or associated financial opportunities. For the purposes of this disclosure, the term industry analyst also includes broader analysts such as financial analysts and as such, analyst information as that term is used in this specification includes financial, operational, and other types of analyst information.

Analyst information useful in the example of FIG. 1 includes white papers, analyst reports, industry reports, financial reports, blogs, news articles, news feeds, RSS feeds, podcasts, television and radio news broadcasts and their associated transcripts, and other relevant analyst information that will occur to those of skill in the art. Furthermore, analyst information according to embodiments of the present invention and the example of FIG. 1 include not only the raw content of produced by the analyst, the analyst's staff or colleague but also metadata describing, explaining, or otherwise augmenting the content itself.

The analyst information repository (270) of FIG. 1 includes an analyst data mining engine (244) that traverses the analyst information, identifies relevant industry trends, and provides those relevant industry trends to the dynamic script engine (206). Data mining is the computing process of discovering patterns in large data sets involving methods at the intersection of machine learning, statistics, and database systems. The data mining engine (244) of FIG. 1 extracts information from a data set transforms that into a definable structure for further use and for presentation to the dynamic script engine (206). Typical data mining engines according to embodiments of the present invention and the example of FIG. 1 include database and data management processes, data pre-processing, model and inference considerations, interestingness metrics, complexity considerations, post-processing of discovered structures, visualization, and repeated updating.

Data mining of analyst information extracts often previously unknown, interesting patterns such as groups of data records (cluster analysis), unusual records (anomaly detection), and dependencies (association rule mining, sequential pattern mining). These patterns can then be seen as a kind of summary of the industry data, and such information may be used by the dynamic script engine (206) in providing real time scripts that are relevant to the customer (232) currently on a sales call.

In the example of FIG. 1, the dynamic script engine (206) invokes and application programming interface ('API') (282) exposed by the analyst information repository (270) to retrieve relevant industry trend data. The dynamic script engine (206) of FIG. 1 receives the industry trend data and passes the industry trend data to its local statistics engine (244).

In the example of FIG. 1, an additional agent result repository (272) also exposes an API (284) to the dynamic script engine (206) to retrieve industry trend data as documented by other tele-agents (234) in recent relevant calls. During calls between various tele-agents and customers in a specific industry a tele-agent may document industry trend data such as specific customers, specific products purchased by those customers, the reasons those customers were interested in those specific products, concerns about the industry expressed by those customers, and other industry trend data that will occur to those of skill in the art. This industry trend data may be documented in the form of industry trend notes made by various tele-agents on sales calls and made available to the dynamic script engine.

In the example of FIG. 1, a stock and commodities market trend aggregating engine (274) also exposes an API (286) to the dynamic script engine (206) to retrieve industry trend data relevant to current trends in stock markets and commodities markets worldwide relevant to a particular industry. Such industry trend data may include ancillary industries that support the industry in which the customer (232) is currently engaged. That is, real-time stock and commodities information is useful to a dynamic script engine (206) of FIG. 1 to develop or reorder sentences in a script to discuss not only the specific industry of the customer (232) but also industries supporting or ancillary to that industry. Such a dynamic script will provide the customer (232) with more information and the opportunity to maximize the customizable and modularize-able product offerings provided by the tele-agent (230).

The stock and commodities market trend aggregating engine (274) of FIG. 1 includes a stock aggregator that aggregates stock information by industry, segment, region, stock market, and other parsed stock information as will occur to those of skill in the art. The stock and commodities market trend aggregating engine (274) of FIG. 1 also includes a commodities aggregator that aggregates commodities information by industry, segment, region, market, and other parsed commodities information as will occur to those of skill in the art.

In the example of FIG. 1, a speech recognition engine (276) also exposes an API (288) to the dynamic script engine (206) to retrieve call transcripts (226) of calls between customers and additional tele-agents (234) as wells as transcripts of the ongoing call between the tele-agent (230) and the current customer (230). Speech recognition (SR) is an inter-disciplinary application of computational linguistics that includes methodologies and technologies that enables the recognition and translation of spoken language into text by computers. It is also known as "automatic speech recognition" (ASR), "computer speech recognition", or just "speech to text" (STT). Speech recognition incorporates knowledge and research in the linguistics, computer science, and electrical engineering fields.

Some speech recognition systems use "training" (also called "enrollment") where an individual speaker reads text or isolated vocabulary into the system. The system analyzes the person's specific voice and uses it to fine-tune the recognition of that person's speech, resulting in increased accuracy. Systems that do not use training are called "speaker independent" systems. Systems that use training are called "speaker dependent".

As mentioned in this specification, dynamic scripts according to embodiments of the present invention provide contextually relevant dynamic scripts. As such, speech recognition engines useful according to embodiments of the present invention may often employ semantic interpretation—sometimes called Semantic Interpretation for Speech Recognition (SISR). Semantic interpretation defines the syntax and semantics of annotations to grammar rules in the specification of the particular speech recognition engine. Such sematic interpretation provides for contextually relevant results useful in embodiments of the present invention.

From the technology perspective, speech recognition has a long history with several waves of major innovations. Speech recognition engines useful according to embodiments of the present invention and in the example of FIG. 1 include those from Google, Microsoft, IBM, Baidu, Apple, Amazon, Nuance, SoundHound, IflyTek, CDAC and others as will occur to those of skill in the art.

In the example of FIG. 1, during a real-time telephone call between the tele-agent (230) and the customer (232) the speech recognition engine identifies through speech identification two parties to the conversation, and coverts the speech to the text of a transcript (226) of the call. The speech recognition engine then provides the transcript (226) to the dynamic script engine and the additional agent result repository (272) through an API (288).

In the example of FIG. 1, the dynamic script engine (206) transmits the current industry score from the statistics engine (244) to a script generator (246). In the example of FIG. 1 the statistics engine (244) and the script generator (246) are depicted and described as local to the dynamic script engine (206). This is for explanation and not for limitation. In fact, statistic engines and script generators may be implemented as remote resources coupled for data communications through a network as will occur to those of skill in the art.

The example script generator (246) of FIG. 1 is implemented as automated computing machinery configured to receive the current industry score from the statistics engine and dynamically reorder in real-time and in dependence upon the industry score one or more sentences of a dynamic script to be read by a sales agent to the customer during the sales call. Reordering sentences is typically carried out in a manner to bring sentences that are relevant to current industry trends earlier into the sales call or to place them strategically in the sales call form maximum effect and to provide the customer with the best information presented in the most effective manner.

Reordering the sentences of a dynamic script may be carried out in dependence upon a set of reordering rules that direct the order of various weighted or unweighted or keyed or un-keyed sentences in dependence upon the industry score. Reordering sentences may include retrieving a sentence number from a current version of the dynamic script, applying a reordering rule having as a variable the industry score, and assigning a new sentence number to the sentence in dependence upon the industry score.

The script generator of FIG. 1 also includes automated computing machinery to select one or more additional sentences and insert the one or more additional sentences into the dynamic script in dependence upon the current industry score. Additional sentences may be retrieved from a repository such as a sentence database of additional content made available to the script generator locally or remotely. Such additional sentences may be retrieved from a sentence database and inserted in a location in the dynamic script according to one or more sentence selection and insertion rules.

In alternative embodiments, the sentences may be created dynamically in dependence upon the current industry trends and products available to the customer as well as dynamic sentence creation rules. Such dynamic sentence creation rules usefully apply the current industry trends and products available or other useful information relevant to the customer to dynamically create relevant sentences for the dynamic script.

In still other alternative embodiments of the example of FIG. 1, additional sentences for the dynamic script may be composed by other tele-agents (234) during other sales calls where were considered effective in communicating with the customer. Such sentences may be captured in transcripts by the speech recognition engine (276) or recorded or documented by other tele-agents themselves and stored in the additional agent result repository, or in other ways as will occur to those of skill in the art.

In the example of FIG. 1, the reordering of sentences or one or more additional sentences added to the dynamic script are directed to products the customer does not already own. In this case, the industry trends and available products suggest that the customer might be better served by products the customer does not already own or license. Alternatively, the one or more additional sentences are directed to features of a software product that customer already owns. In this case, a customer may be educated as to how products the customer has already bought or licensed my better serve the needs of the customer such as by upgrading features, adding modules, configuring aspects of the software in a manner that is more effective for the customer, or in other ways as will occur to those of skill in the art.

The remote resources (270, 272, 274, 276) described in the example of FIG. 1 are provided for explanation and not for limitation. In fact, many additional or different resources may be useful in creating dynamic scripts according to embodiments of the present invention and all such resources are well within the scope of the present invention.

Figure 2:
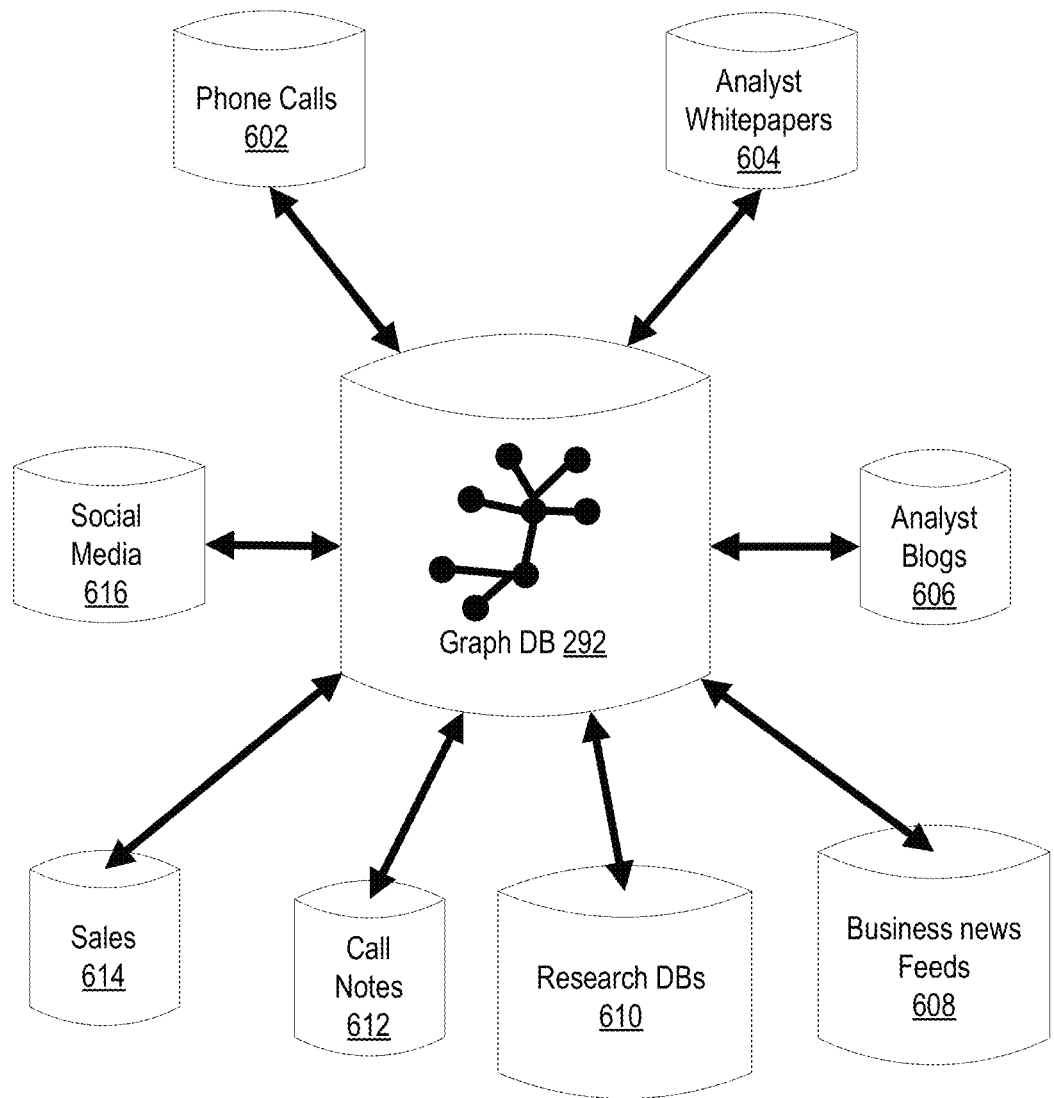
FIG. 2 sets forth a line drawing illustrating a schematic depiction of a graph database useful according to embodiments of the present invention.

For further explanation, FIG. 2 sets forth a line drawing illustrating a schematic depiction of a graph database useful according to embodiments of the present invention. The example graph database (292) of FIG. 2 is populated from a number of remote resources to support the generation of contextually relevant dynamic scripts as will occur to those of skill in the art. In the example of FIG. 2, the graph database (292) is populated by data from phone calls (602) between tele-agents and customers call notes (612) from other tele-agents, analyst blogs (606), business news feeds (608) and social media (616). Such information is often useful in dynamic script creation because it provides the graph database with real-time contextual information regarding industry trends.

In the example of FIG. 2, the graph database (292) is populated by data from sales information (614) of various products, research databases (610) such as Hoovers, and analyst whitepapers (604). Such information is often useful in dynamic script creation because it provides the graph database with contextual information regarding industry trends that may be relevant to real-time analysis but may also relate real-time information to longer-term industry trends.

Figure 3:
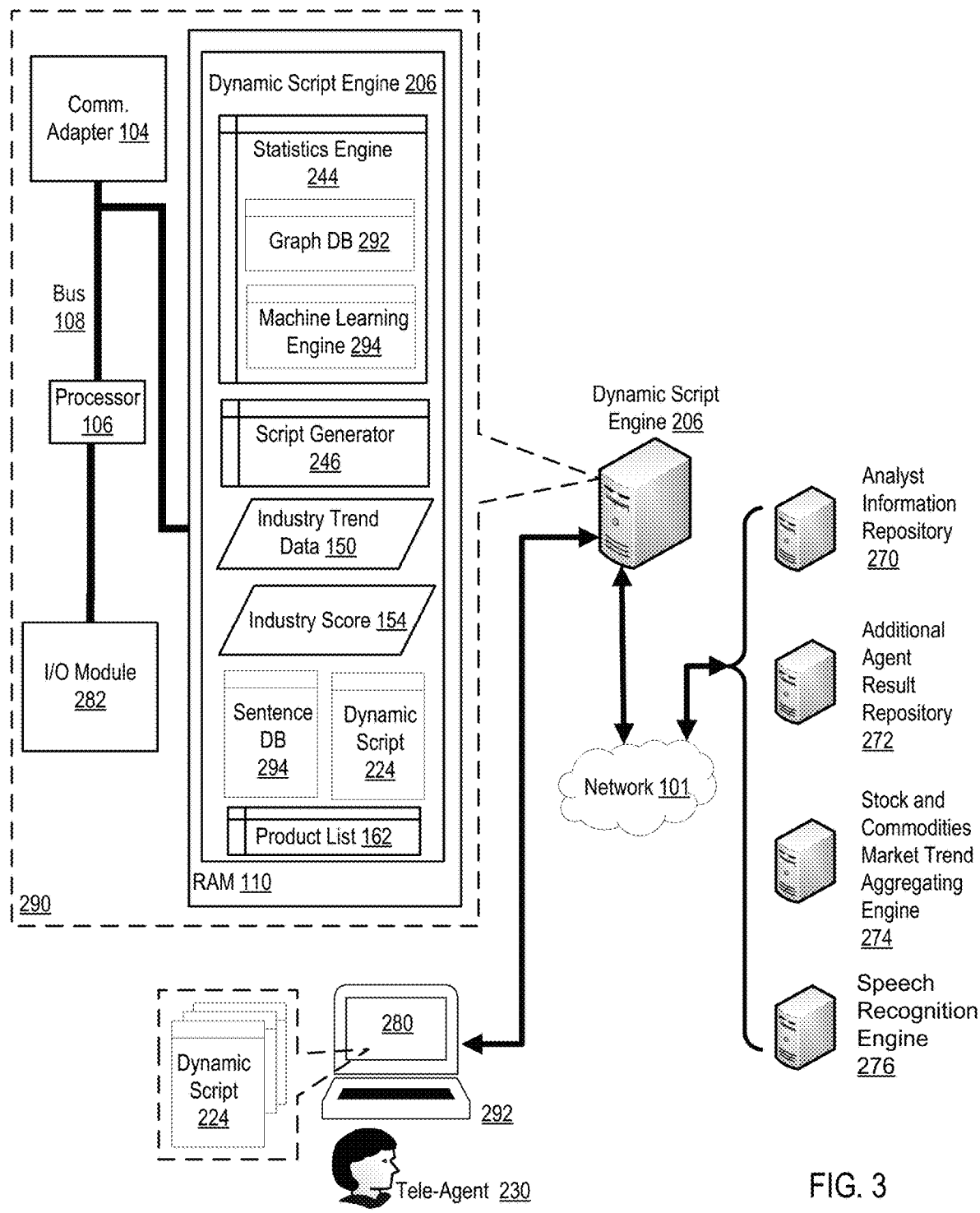
FIG. 3 sets forth a block diagram of an example system for creating an on-call real-time dynamic script for a tele-agent according to embodiments of the present invention.

For further explanation, FIG. 3 sets a forth block diagram of an example system for creating an on-call real-time dynamic script for a tele-agent according to embodiments of the present invention. The system of FIG. 3 includes a dynamic script engine (206) coupled for data communications through a network (101) to a number of remote resources including an analyst repository (270), an additional agent result repository (272), a stock and commodities market trend aggregating engine (274), and a speech recognition engine. The remote resources (270, 272, 274, 276) of FIG. 3 are presented in this example for explanation and not for limitation. In fact, creating an on-call real-time dynamic script for a tele-agent according to embodiments of the present invention may include additional remote resources as will occur to those of skill in the art.

In the example of FIG. 3, the tele-agent is capable of viewing the dynamic script (224) on a dashboard or other application displayed on a user interface (280) on a local computer (292). The computer (292) in the example of FIG. 3 is shown to be local to the dynamic script engine (206). In other embodiments of the present invention, a computer used by the tele-agent displaying the dynamic script may be implemented as a remote to the dynamic script engine (206) and may be connected a shared network, or other network for remote connectivity as will occur to those of skill in the art.

In the example of FIG. 3, the dynamic script engine (206) is depicted as being implemented as software running on a server (290). This depiction is for explanation and not for limitation. As mentioned above, the dynamic script engine may be implemented in any number of permutations of automated computing machinery as will occur to those of skill in the art.

Turning again to FIG. 3, the example server (290) includes random access memory (110), a processor (106), a communications adapter (104), a video adapter (102), and an I/O module (202) connected to a data bus (108) and the dynamic script engine (206) is stored in RAM (110). The dynamic script engine (206) of FIG. 3 includes a statistics engine (224) (which in turns includes a machine learning engine (294)) and a script generator (246). The statistics engine (244) of FIG. 3 is configured to receive, during a sales call, real-time industry trend data (150) from one or more remote industry resources (270, 272, 274, and 276); create a current industry score (154) in dependence upon the industry trend data (150) and current products (162) available to a customer on an active call; and transmit a current industry score (154) to a script generator (246).

As mentioned above, the statistics engine (244) of FIG. 3 is configured to create a current industry score (154) in dependence upon the industry trend data (150) and current products (162) by creating a real-time graph database including nodes, edges, and properties in dependence upon real-time trend data; traversing the graph database; applying a machine learning engine to the traversed graph database; and creating a current industry trend score in dependence of the application of the machine-learning engine, the traversed graph database, and the real-time industry trend data.

The script generator (246) of FIG. 3 is configured to receive the current industry score (154) from the statistics engine (244) and dynamically reorder in real-time and in dependence upon the industry score one or more sentences of a dynamic script to be read by a sales agent to the customer during the sales call. The script generator (246) is also configured to select one or more additional sentences from a sentence database (294) in dependence upon the industry score and insert the one or more additional sentences into the dynamic script (224).

Figure 4:
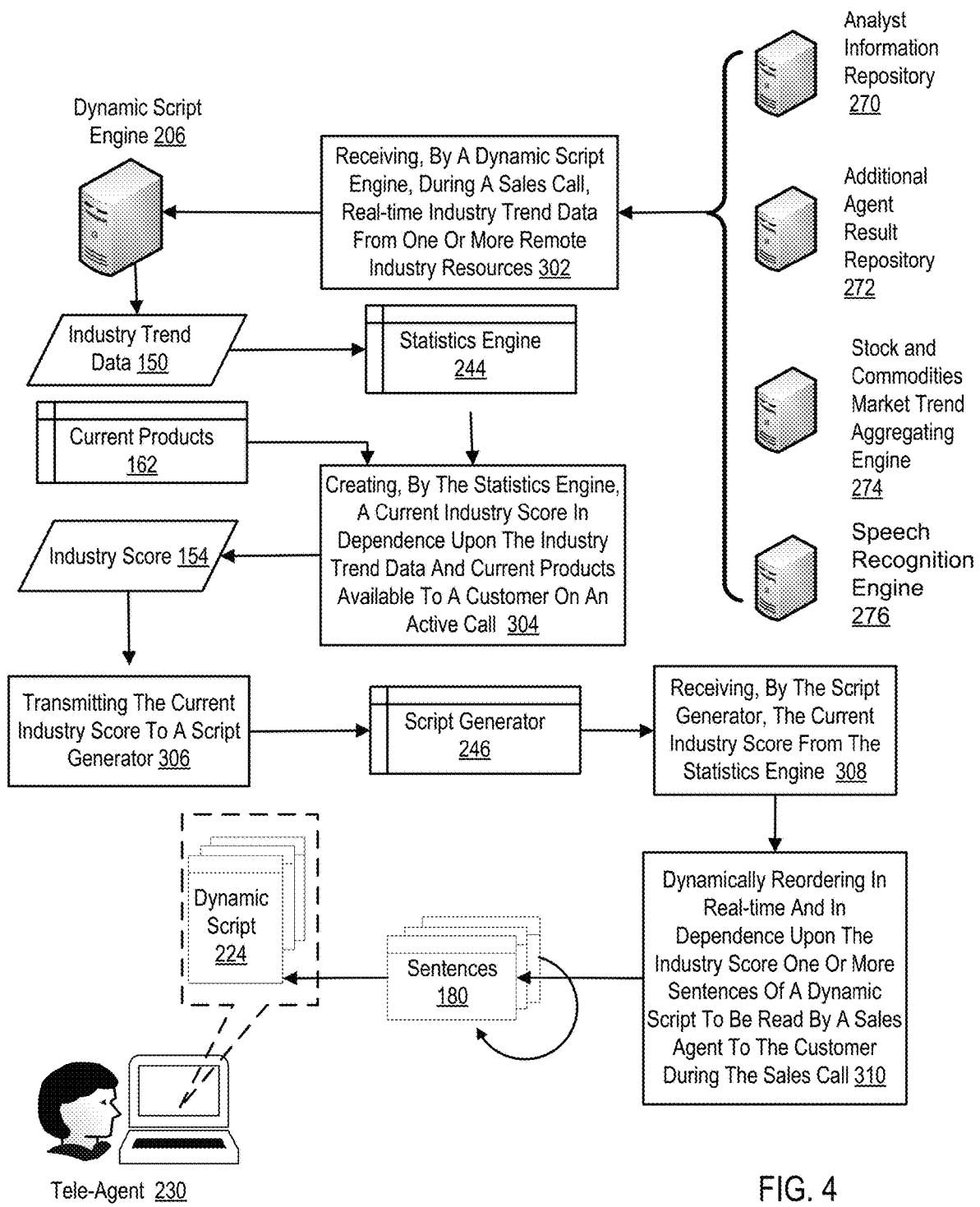
FIG. 4 sets forth a flow chart of an example method for creating an on-call real-time dynamic script for a tele-agent according to embodiments of the present invention.

For further explanation, FIG. 4 sets forth a flow chart of an example method for creating an on-call real-time dynamic script (224) for a tele-agent (230) according to embodiments of the present invention. The method of FIG. 1 includes receiving (302), by a dynamic script engine (206), during a sales call, real-time industry trend data (150) from one or more remote industry resources (270, 272, 274, 276). One example remote resource depicted in the example of FIG. 4 includes an analyst information repository (270) containing industry trend data mined from analyst information. As mentioned above, industry trend data (150) is information data mined from analyst information such as white papers, analyst reports, industry reports, financial reports, blogs, news articles, news feeds, RSS feeds, podcasts, television and radio news broadcasts and their associated transcripts, and other relevant analyst information that will occur to those of skill in the art.

Another example remote resource depicted in the example of FIG. 4 is an additional agent result repository (272) containing industry trend data collected from other tele-agents on other sales calls. This industry trend data may be documented in the form of industry trend notes made by various tele-agents on sales calls and made available to the dynamic script engine. Tele-agent trend notes may be data mined in the same or similar fashion as the analyst information.

Another example remote resource depicted in the example of FIG. 4 is a stock and commodities market trend aggregating engine (274) that aggregates industry trend data regarding stocks and commodities. Such trend data may be derived from the stocks and commodities themselves, their relative positions, their historic patterns. Such trend data may also be directed to regional stocks and commodities as well as particular markets or other aspects of stocks and commodities as will occur to those of skill in the art. This aggregated stock and commodities information may be data mined in the same or similar fashion as the analyst information.

Another example remote resource depicted in the example of FIG. 4 is a speech recognition engine (276) that contains transcripts of the current sales call and other sales calls occurring between other tele-agents and other customers. Such transcripts may be data mined in the same or similar fashion as the analyst information to derive industry trend data as will occur to those of skill in the art.

The method of FIG. 4 also includes creating (304) a current industry score (154) in dependence upon the industry trend data (150) and current products (162) available to a customer on an active call. A current industry score created according to embodiments of the present invention and the example of FIG. 4 may implemented as a value, set of values, or dynamic formula that represents a current trend in an industry. The current industry score of FIG. 4 may be implemented as a value, set of values, formulaic representation or other value representation of a current state of an industry trend. used to select sentences to be reordered, added, or deleted from the dynamic script, to select the content of those sentences, and other dynamic script content creation and reformulation as will occur to those of skill in the art.

The method of FIG. 4 also includes transmitting (306) the current industry score to a script generator (246). Transmitting (306) the current industry score to a script generator (246) may be carried out by invoking an API, passing the current industry score in a message, passing the current industry score through shared data and in other ways as will occur to those of skill in the art.

The method of FIG. 4 also includes receiving (308), by the script generator (246), the current industry score (154) from the statistics engine (244). Receiving (308), by the script generator (246), the current industry score (154) from the statistics engine (244). may be carried out by invoking an API, receiving the current industry score in a message, receiving the current industry score through shared data and in other ways as will occur to those of skill in the art.

The method of FIG. 4 also includes dynamically reordering (310) in real-time and in dependence upon the industry score (154) one or more sentences (180) of a dynamic script (224) to be read by a tele-agent (230) to the customer during the sales call. Reordering the sentences of a dynamic script may be carried out in dependence upon a set of reordering rules that direct the order of various weighted or unweighted or keyed or un-keyed sentences in dependence upon the industry score. Reordering sentences may include retrieving a sentence number from a current version of the dynamic script, applying a reordering rule having as a variable the industry score, and assigning a new sentence number to the sentence in dependence upon the industry score.

Figure 5:
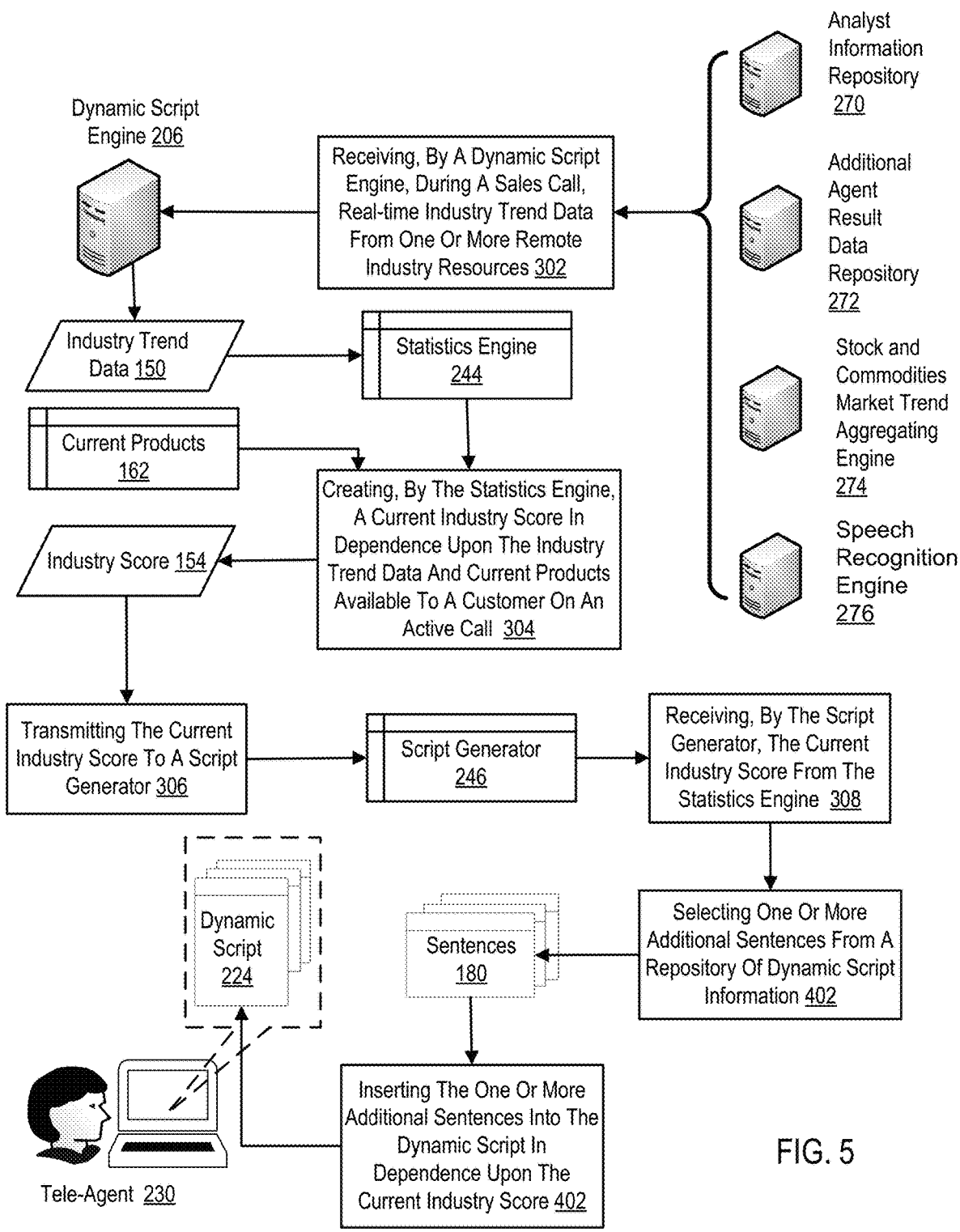
FIG. 5 sets forth a flow chart of an example method for creating an on-call real-time dynamic script for a tele-agent according to embodiments of the present invention, FIG. 6 sets forth a flow chart of an example method for creating an on-call real-time dynamic script for a tele-agent according to embodiments of the present invention.

For further explanation, FIG. 5 sets forth a flow chart of an example method for creating an on-call real-time dynamic script (224) for a tele-agent (230) according to embodiments of the present invention. The method of FIG. 5 is similar to the method of FIG. 4, in that the method of FIG. 5 includes receiving (302), by a dynamic script engine (206), during a sales call, real-time industry trend data (150) from one or more remote industry resources (270, 272, 274, 276); creating (304) a current industry score (154) in dependence upon the industry trend data (150) and current products (162) available to a customer on an active call; transmitting (306) the current industry score to a script generator (246); receiving (308), by the script generator (246), the current industry score (154) from the statistics engine (244).

The method of FIG. 5 differs from the method of FIG. 4 in that the method of FIG. 5 does not include dynamically reordering in real-time and in dependence upon the industry score one or more sentences of a dynamic script to be read by a tele-agent to the customer during the sales call. The method of FIG. 5, instead, includes selecting (402) one or more additional sentences (180) from a repository of dynamic script information and inserting (402) the one or more additional sentences into the dynamic script (224) in dependence upon the current industry score. Additional sentences may be retrieved from a repository such as a sentence database of additional content made available to the script generator locally or remotely. Such additional sentences may be retrieved from a sentence database and inserted in a location in the dynamic script according to one or more sentence selection and insertion rules.

Figure 6:
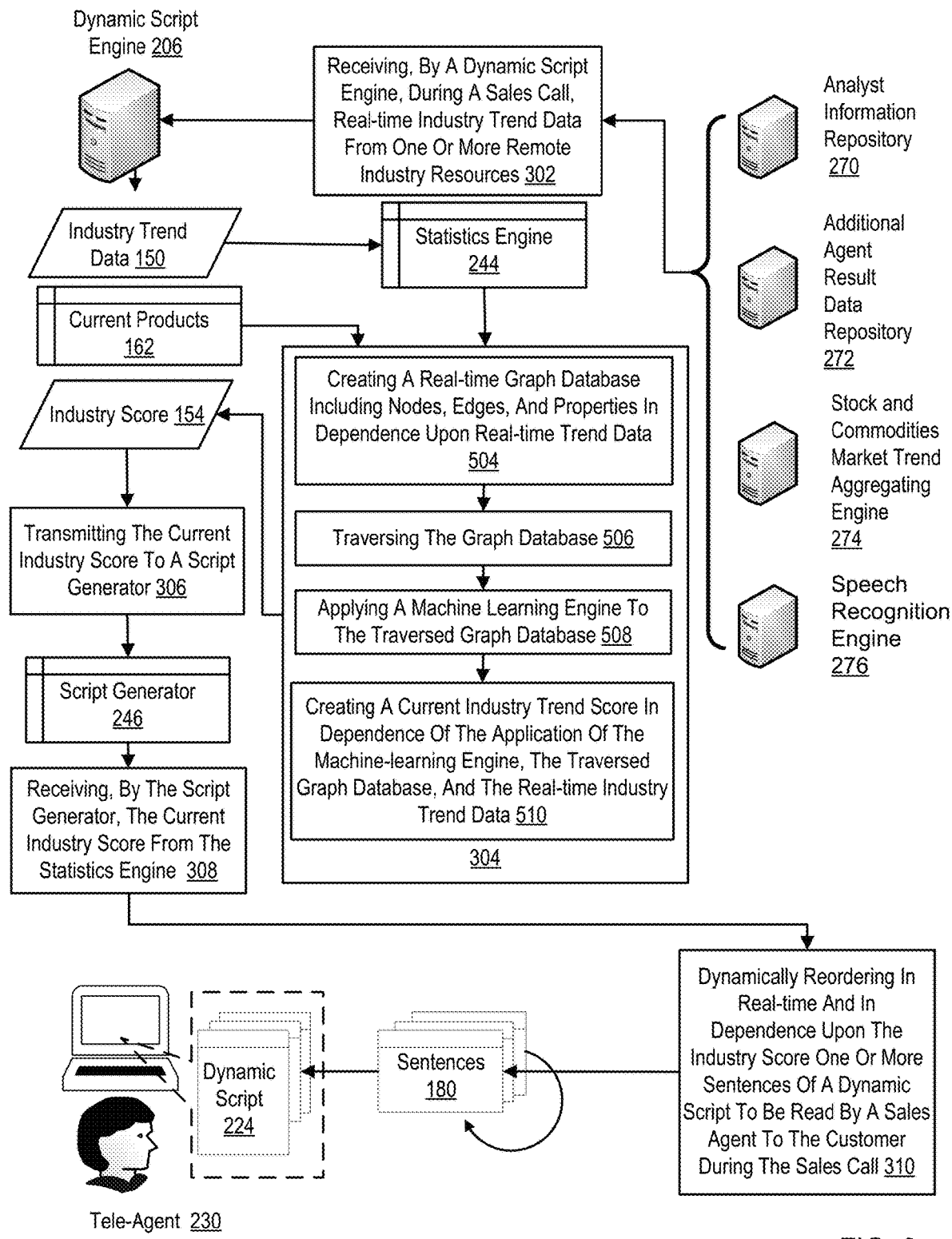

For further explanation, FIG. 6 sets forth a flow chart of an example method for creating an on-call real-time dynamic script (224) for a tele-agent (230) according to embodiments of the present invention. The method of FIG. 6 is similar to the method of FIG. 4, in that the method of FIG. 5 includes receiving (302), by a dynamic script engine (206), during a sales call, real-time industry trend data (150) from one or more remote industry resources (270, 272, 274, 276); creating (304) a current industry score (154) in dependence upon the industry trend data (150) and current products (162) available to a customer on an active call; transmitting (306) the current industry score to a script generator (246); receiving (308), by the script generator (246), the current industry score (154) from the statistics engine (244) and dynamically reordering (310) in real-time and in dependence upon the industry score (154) one or more sentences of a dynamic script (244) to be read by a tele-agent (230) to the customer during the sales call.

In the method of FIG. 6, creating (304) a current industry score (154) in dependence upon the industry trend data (150) and current products (162) available to a customer on an active call includes creating (504) a real-time graph database including nodes, edges, and properties in dependence upon real-time industry trend data (150). Creating a real-time graph database includes receiving the trend data and identifying within it data to be assigned as node data, data to be assigned as edge data, and assigning properties to the industry trend data such that the graph database can be traversed and a machine learning engine can be applied to the industry trend data to derive an industry score.

In the method of FIG. 6, creating (304) a current industry score (154) in dependence upon the industry trend data (150) and current products (162) available to a customer on an active call includes traversing (506) the graph database. Traversing the graph data base includes analyzing the nodes, edges, and properties of the graph database and providing the information associated with nodes, edges, and properties of the graph database to a machine learning engine.

In the method of FIG. 6, creating (304) a current industry score (154) in dependence upon the industry trend data (150) and current products (162) available to a customer on an active call includes applying (508) a machine learning engine to the traversed graph database to produce a current industry score (150) in dependence of the application of the machine learning or datamining applications, the information from the traversed graph database which in turn is derived from the real-time industry trend data (150).

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

FIGS. 1-5 illustrate the architecture, functionality, and operation of possible implementations of systems, methods and products according to various embodiments of the present invention. In this regard, each block in a flowchart or block diagram may represent a module, segment, or portion of code or other automated computing machinery, which comprises one or more executable instructions or logic blocks for implementing the specified logical function(s). It should also be noted that, in some alternative implementations, the functions noted in the block may occur out of the order noted in the figures. For example, two blocks shown before or after one another may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for creating an on-call real-time dynamic script for a tele-agent the method comprising the steps of:
  receiving, by a dynamic script engine, during a sales call, real-time industry trend data from one or more remote industry resources from a resource group consisting of an analyst information repository and a stock and commodities market trend aggregator;

calculating using regression analysis of the industry trend data and current products available to a customer to create a current industry score during the sales call, wherein creating the current industry score in dependence upon the industry trend data and current products available to the customer further comprises:

creating a real-time graph database including nodes, edges, and properties in dependence upon real-time industry trend data;

traversing the real-time graph database;

applying a machine learning engine to the traversed real-time graph database; and creating the current industry score in dependence of an application of the machine-learning engine, the traversed real-time graph database, and the real-time industry trend data;

transmitting the current industry score to a script generator;

receiving, by the script generator, the current industry score from a statistics engine; and dynamically reordering in real-time and in dependence upon the current industry score and the traversed real-time graph database one or more sentences of a dynamic script presented to the tele-agent during the sales call, wherein dynamically reordering one or more sentences comprises:

retrieving a sentence number from the dynamic script, applying a reordering rule that is a function of the current industry score, and assigning a new sentence number to the sentence based on the current industry score.

2. The method of claim 1 further comprising:

selecting one or more additional sentences from a repository of dynamic script information; and inserting the one or more additional sentences into the dynamic script.

3. The method of claim 2 wherein the one or more additional sentences are directed to a software product that the customer does not already own.

4. The method of claim 2 wherein the one or more additional sentences are directed to features of a software product that the customer already owns.

5. The method of claim 1 wherein:

the resource group includes a speech recognition engine; and the industry trend data includes data derived from one or more transcripts of other sales calls of other tele-agents.

6. The method of claim 1 wherein:

the resource group includes an agent result data repository; and the industry trend data includes one or more notes made by other tele-agents on other sales calls.

7. The method of claim 1 wherein the industry trend data includes real-time commodities information.

8. The method of claim 1 wherein the industry trend data includes real-time stock information.

9. A system for creating real-time dynamic scripts for tele-agents, comprising:

a computer server coupled to a network, the computer server having a processor and a memory; and a dynamic script engine software module stored in the memory and executable by said processor, said dynamic script engine software module including a statistics engine software module, a script generator software module, a product list, and a repository of dynamic script information;

said computer server coupled via the network to at least one remote resource from a resource group consisting of an analyst information repository and a stock and commodities market trend aggregator;

said statistics engine software module configured to, during the sales call, receive real-time industry trend data from the at least one remote resource, and calculate, using regression analysis of the product list and the real-time industry trend data, a current industry score, wherein:

the dynamic script engine software module further includes a graphical database system;

the statistics engine software module is further configured to store the real-time industry trend data using the graphical database system to create a real-time graph database having a plurality of nodes, edges, and properties, traverse the real-time graph database, apply a machine learning algorithm to the traversed real-time graph database; and create the current industry score in dependence of an application of the machine-learning algorithm, the traversed real-time graph database, and the real-time industry trend data;

said script generator software module configured to, during the sales call, dynamically reorder in real-time and in dependence upon the current industry score and the traversed real-time graph database, one or more sentences of a dynamic script presented to a sales agent during the sales call, wherein dynamically reordering the one or more sentences comprises:

retrieving a sentence number from the dynamic script, applying a reordering rule that is a function of the current industry score, and assigning a new sentence number to the sentence based on the current industry score.

10. The system of claim 9 wherein:

the script generator software module is further configured to select from the repository of dynamic script information an additional sentence and insert the sentence into the dynamic script.

11. The system of claim 9 wherein:

said computer server is coupled to an agent result data repository that includes a plurality of sales call notes;

said computer server is coupled to a speech recognition engine that includes a plurality of call transcripts; and the real-time industry trend data includes data derived from the plurality of sales call notes and the plurality of call transcripts.

12. The system of claim 11 wherein:

the graph database includes data originating from one or more of the group consisting of the plurality of call transcripts, the plurality of sales call notes, a white paper, a social media account, an analyst blog, a business news feed, a commercial research database, and a prior sale.

13. The system of claim 9 wherein:
said regression analysis is parametric.
14. The system of claim 13 wherein:
said regression analysis includes one from the group consisting of a linear regression and an ordinary least squares regression.
15. The system of claim 9 wherein:
said regression analysis is nonparametric.

* * * * *